US007916854B2

(12) United States Patent
Lamberton et al.

(10) Patent No.: US 7,916,854 B2
(45) Date of Patent: Mar. 29, 2011

(54) METHODS AND APPARATUS FOR CONTROLLING PROCESSING ENTITIES, SUCH AS DISTRIBUTED SIGNALLING GATEWAYS

(75) Inventors: Marc Lamberton, Antibes (FR); Stephane Barbier, Mouans-Sartoux (FR); Didier Desiderio, Le Cannet (FR)

(73) Assignee: Hewlett-Packard Development Company, Houston, TX (US)

( * ) Notice: Subject to any disclaimer, the term of this patent is extended or adjusted under 35 U.S.C. 154(b) by 1684 days.

(21) Appl. No.: 10/817,575

(22) Filed: Apr. 2, 2004

(65) Prior Publication Data

US 2004/0264671 A1    Dec. 30, 2004

(30) Foreign Application Priority Data

Apr. 3, 2003    (EP) .................................... 03290837

(51) Int. Cl.
*H04M 7/00* (2006.01)
(52) U.S. Cl. .............. 379/221.03; 379/221.01; 379/229; 370/352
(58) Field of Classification Search .................. 370/352; 379/229, 426, 221.01, 221.03
See application file for complete search history.

(56) References Cited

U.S. PATENT DOCUMENTS

| 5,084,816 | A | | 1/1992 | Boese et al. | |
|---|---|---|---|---|---|
| 5,848,128 | A | * | 12/1998 | Frey .................................. | 379/9 |
| 5,966,431 | A | * | 10/1999 | Reiman et al. ........... | 379/115.01 |
| 6,137,806 | A | * | 10/2000 | Martinez ........................ | 370/428 |
| 2002/0018462 | A1 | * | 2/2002 | Thompson et al. ........... | 370/352 |
| 2002/0093981 | A1 | * | 7/2002 | Turina et al. .................. | 370/467 |
| 2002/0105969 | A1 | * | 8/2002 | Benedyk et al. .............. | 370/466 |
| 2002/0156925 | A1 | * | 10/2002 | Suzuki .......................... | 709/249 |
| 2002/0186687 | A1 | * | 12/2002 | Roque et al. .................. | 370/352 |
| 2002/0188650 | A1 | * | 12/2002 | Sun et al. ...................... | 709/105 |
| 2004/0240486 | A1 | * | 12/2004 | Venkatesh et al. ............ | 370/537 |

FOREIGN PATENT DOCUMENTS

| EP | 1 089 575 | 4/2001 |
|---|---|---|
| EP | 1 261 217 | 11/2002 |

OTHER PUBLICATIONS

Performance Technologies, Tutorial: Interworking Switched Circuit and Voice-over-IP Networks, Aug. 22, 2001.*
http://en.wikipedia.org/wiki/Connectionless_protocol Connectionless Protocol.*
http://en.wikipedia.org/wiki/Point_Code Point Code.*
Brian Bidulock, "Application Server Process (ASP) Extension (ASPEXT) Framework for Signalling User Adaptation Layers" [draft-dudlock-sigtran-aspext-01.txt]; Jan. 2, 2003.

(Continued)

*Primary Examiner* — Ahmad F Matar
*Assistant Examiner* — Khai N Nguyen

(57) ABSTRACT

A method of controlling a local process that forms part of a first processing entity, where the first processing entity maintains a plurality of associations with a plurality of remote processes in a second processing entity, comprises receiving a failure message from a remote process indicating a fault affecting an association linking the local process with that remote process; queueing data messages destined for that remote process; controlling the transmission of an acknowledgement of the failure message so that data messages pending on the association are received at that remote process before the acknowledgment of the failure message; and initiating a traffic diversion to set up an alternate path between the first processing entity and the second processing entity for queued data messages.

29 Claims, 10 Drawing Sheets

OTHER PUBLICATIONS

Brian Bidulock, Correlation ID and Hearbeat Procedures (CORID) Supporting Lossless Fail-Over between SCTP Associations for Signalling User Adaptation Layers [draft-didlock-sigtran-corid-01.ps]; Jan. 2, 2003 (Version 0.1).

Brian Bidulock, Correlation ID and Hearbeat Procedures (CORID) Supporting Lossless Fail-Over between SCTP Associations for Signalling User Adaptation Layers [draft-didlock-sigtran-corid-02.ps]; Jul. 26, 2003 (Version 0.2).

Brian Bidulock, Correlation ID and Hearbeat Procedures (CORID) Supporting Lossless Fail-Over between SCTP Associations for Signalling User Adaptation Layers [draft-didlock-sigtran-corid-03.ps]; Feb. 21, 2004 (Version 0.3).

Series Q: "Switching and Signalling" Specifications of Signalling System No. 7—Message transfer part, ITU-T Telecommunication Standardization Sector of ITU International Telecommunication Union, Q.704 (Jul. 1996) pp. 1-37.

European Search Report from counterpart foreign application EP1465440A1, Jan. 16, 2004.

* cited by examiner

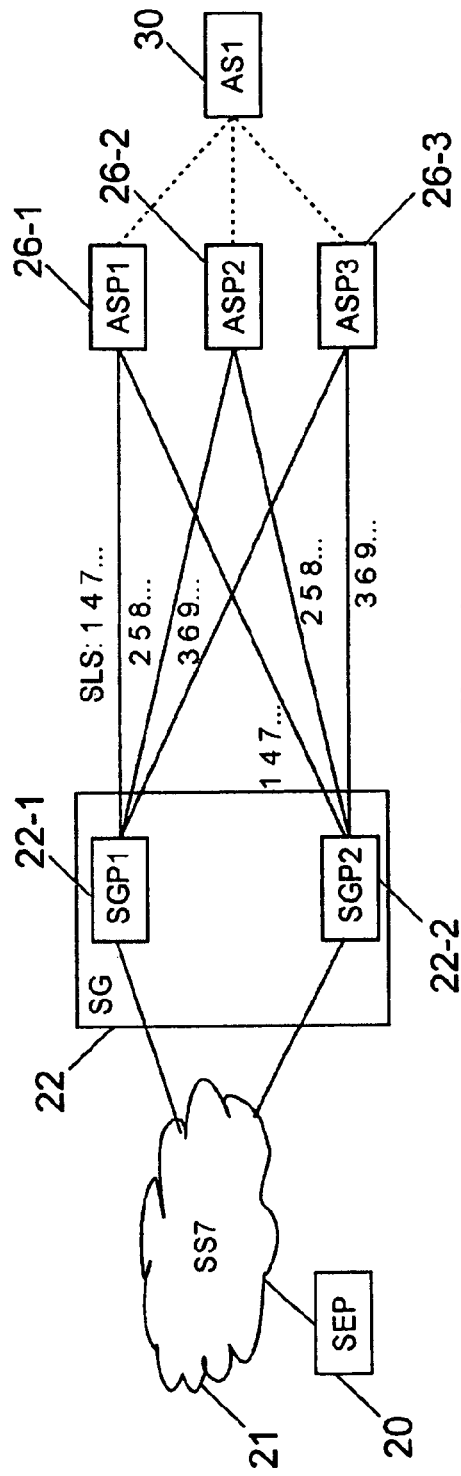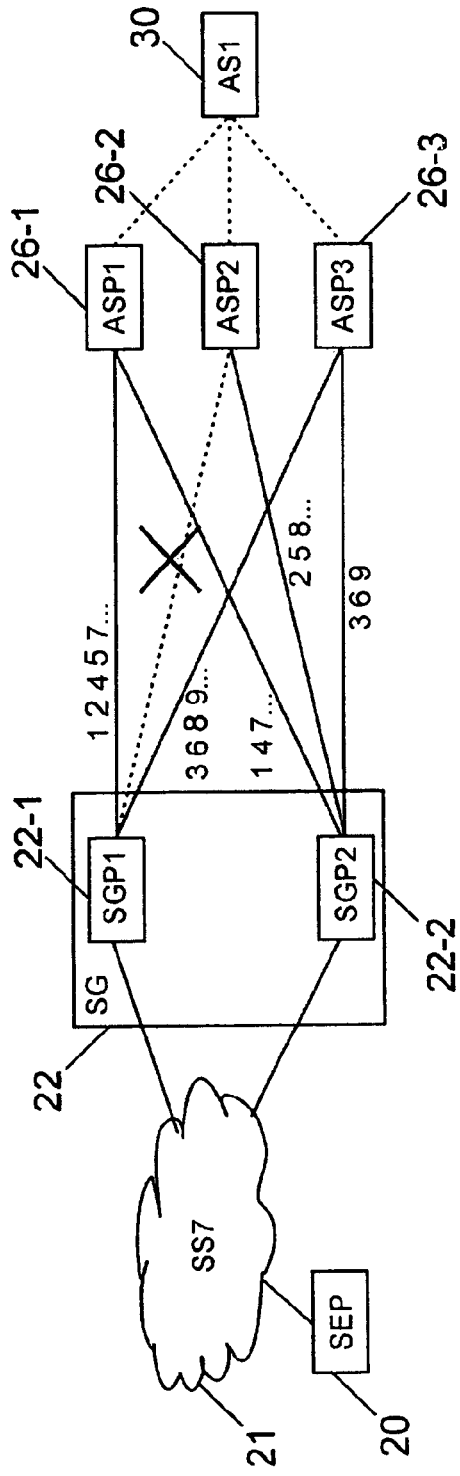
Fig. 4
Fig. 5

METHODS AND APPARATUS FOR CONTROLLING PROCESSING ENTITIES, SUCH AS DISTRIBUTED SIGNALLING GATEWAYS

BACKGROUND OF THE INVENTION

1. Field of the Invention

The invention relates to methods, and related apparatus, for controlling processing entities used, for instance, in communication systems such as for the control of signalling traffic between a distributed signalling gateway and application server processes.

2. Background Art

Establishing connections between two telephones involves a complex interaction of digital messages, hereinafter referred to generally as signalling. Nowadays telephone systems perform what is known as "out-of-band" signalling. Out-of-band signalling means that the communications required between the switches and other equipment in the network take place on communication channels other than the channel by which the voice or data flows. Typically, the out-of-band signalling takes place by means of digital communication channels. Thus, the public switch telephone network (PSTN) generally uses two types of channels, media and signalling.

Several protocols have been defined for out-of-band signalling. The most commonly used protocol, in North America, Asia and Europe, is known as Signalling System No. 7 (SS7). However, the SS7 protocol defines more than just a protocol for communication between switches. It also defines an entire switching network for facilitating signalling for call establishment, routing, and information exchange functions of switched circuit networks.

Since the amount of data transferred over data networks is now much larger than the voice traffic that is carried over the PSTN, carriers are willing to consolidate both types of networks. Therefore, there is a trend in the telephone industry to migrate telephone systems using SS7-based networks for signalling to Internet Protocol (IP) networks. The Internet protocols are standardised by the Internet Engineering Task Force (IETF). Moving either or both of the media and signalling channels to an IP infrastructure involves the use of very different technologies and can be done independently. One IETF working group, called the Sigtran Group, is focussing on protocol definitions for back-hauling SS7 signalling messages across IP networks.

The following discussion is premised upon one of ordinary skill in the art having a working understanding of the character and format of switching signals in SS7 networks, as well as the character and nature of converting SS7 signals for transport across IP networks. The IETF in collaboration with the Sigtran group have taken the initiative to define open standards for transporting SS7 over IP networks. With Sigtran technology, telephone services which today lie on top of SS7 networks, can run Application Servers (ASs) lying on top of IP networks. The interworking with SS7 networks is performed by Sigtran signalling gateways also referred as SGs.

The evolution to IP based infrastructures is driven by cost reduction, but it will happen only if Sigtran technology can be shown to be as reliable as the incumbent SS7 technology. For additional information regarding SS7 network switching over IP networks, reference may be made to the (IETF) working drafts "*Signalling Connecting Control Part User Adaptation Layer (SUA)*" available from the IETF website at www.ietf.org, which is incorporated herein by reference as if reproduced in full.

Likewise, reference may be made to the IETF RFC 3332 "*SS7 MTP3—User Adaptation Layer (M3UA)*", available from the IETF website, and which is incorporated herein by reference as if reproduced in full. It is noted that each of these IETF documents is a work in progress and is therefore subject to change. However, these documents exemplify to one of ordinary skill in the art the changes necessary to a standard SS7 signalling system for its implementation in an IP networks context. Even though the following description focuses on implementing a distributed M3UA signalling gateway, it should also be kept in mind that the same techniques also apply to SUA signalling gateways.

For additional information regarding Sigtran protocols, reference may be made to the International Engineering Consortium, in document "*SS7 Over IP Signalling Transport and SCTP*," which is available from the IEC website www.iec.org, and which is incorporated herein by reference as if reproduced in full.

FIG. 1-A shows a block diagram illustrating a system migration operating under the SS7 protocol to a SS7 system using IP protocol. Before the migration, the SS7 Signalling End Point (SEP) 10 is connected to the SS7 Applications 12 identified by a SS7 User Part and a SS7 Stack through a SS7 network 11. Since the Sigtran framework architecture defines several functions required to backhaul SS7 Applications on an IP network 24, after migration over the IP network, communication between the SS7 Stack of signalling gateway 22 and SS7 User Part of the Application Server 26, 28 is established through an IP SCTP network 24, where SCTP stands for Stream Control Transfer Protocol. More particularly, communication is established through their respective M3UA layers. On the other side of signalling gateway 22, communication between SS7 Stack 22 and SS7 SEP 20 remains unchanged and is established through the SS7 network 21.

As is known in the prior art, a Signal Transfer Point (STP) routes SS7 signalling within the SS7 network and manages various signalling links which comprise the SS7 network. Routing is accomplished by processing of the routing label of an SS7 message by the Message Transfer Part (MTP) functionality of the signalling point. The MTP layers comprise three levels. Levels 1 and 2 are used for the transfer of SS7 messages from one point to another over an individual signalling link. Level 3 is used for the transfer of SS7 messages over the SS7 network beyond the requirements of individual link transmission. The MTP3 layer is mainly dedicated to ensuring the delivery of incoming and outgoing messages (such as discrimination, distribution and routing), and the network reconfiguration (such as traffic management, route management and link management). In brief, levels 1 and 2 are used for transport over individual links whereas level 3 is used for transport over the SS7 network in general.

Signalling Gateway 22 terminates SS7 lower layers and encapsulates their payload data into SCTP (Stream Control Transfer Protocol) messages to send them to an Application Server 28, 26, shown in FIG. 1B. Communication between Signalling Gateway Processes (SGPs) of the SG 22 and Application Server Processes (ASPs) is done using the transport layer defined by the Sigtran working group and referred to as SCTP. The AS terminates the SCTP, processes the signalling messages and replies to the SG in the same way.

However, in the SS7 network 21, messages are not transported over SCTP. Therefore, the SG 22 is responsible for terminating MTP level 3 of the SS7 protocol and offering an IP-based extension to its users. In the case of SS7 and M3UA interworking, the M3UA adaptation layer is designed to provide an extension of the MTP3 layer.

FIG. 1-B illustrates the SUA case with backhauling of a Signalling Connection Control Part (SCCP) sub-system over the IP network. This subsystem is identified by a Routing Key (RK), which has to comply with a set of rules that apply to an SCCP header. More specifically, a Routing Key describes a set of SS7 parameters and parameter values that uniquely define the range of signalling traffic to be handled by a particular Application Server. Parameters within the Routing Key cannot extend across more than a single Signalling Point Management Cluster. Each signalling packet processed by the SG, and which matches this Routing Key, is forwarded to the corresponding ASP and each AS is identified by a Routing Key that describes the types of services that are being provided. Routing Key RK and Transmission Id TID play the same roles respectively for the AS and the ASP.

FIG. 1-B shows a basic configuration of the different layers of the layered protocol communications schemes of the different network elements: a Signalling Gateway Process SGP 22, a Signalling End Point SEP 20 and an Application Server Process ASP 26. Signalling Gateway Process SGP 22 provides an interworking function between an SS7 network connected to Signalling End Point SEP 20 and an IP network connected to Application Server Process ASP 26. Signalling Gateway Process 22 communicates with the Signalling End Point through the use of MTP2 and MTP3 layers, and a SCCP layer which communicates with a Nodal Interworking Function (NIF). The Nodal Interworking Function is in effect the highest level software program performing the signalling gateway functions. Signalling Gateway Process 22 has a corresponding set of protocol layers (IP, SCTP and M3UA or SUA). Rather than an M3UA layer on top of a SCTP layer, it is possible to use the SUA layer. Furthermore, embodiments using other Sigtran adaptation layers such as TUA and the like can also be implemented according to the present invention.

The Signalling End Point 20 has a structure similar to the Signalling Gateway Process 22 apart from the additional two layers TCAP and MAP. TCAP is the protocol layer which ultimately interprets the commands and sends responses to the Signalling End Point 20. On the other side of the network, in the same way, the Application Server Process 26 has essentially the same layer arrangement as the Signalling End Point 20 and additionally includes on top of the SCCP layer, TCAP and MAP layers. The MAP and TCAP layers of the Signalling End Point 20 may be directly connected to MAP and TCAP layers of Application Server Process 26. It will be understood that the TCAP and MAP layers are described here merely as examples of protocols lying on top of MTP3 and SCCP layers.

Furthermore, there are additional differences between IP networks and SS7 networks. Sigtran defines User Adaptation Layers (UAs) as follows:
M2UA and M2PA: when SS7 is terminated at layer 2, MTP3 messages are encapsulated into M2UA (or M2PA) over SCTP.
M3UA: when SS7 is terminated at layer 3, user part messages are encapsulated into M3UA over SCTP. The User part can be ISUP, SCCP
SUA: when SS7 is terminated at the SCCP layer, application part messages are encapsulated into SUA over SCTP. The Application part can be for example TCAP or RANAP.
TUA: when SS7 is terminated at TCAP layer, TCAP payloads are encapsulated into TUA over SCTP.

Generally speaking, signalling across an IP network involves replacing the lower levels of the SS7 layered protocol communications and transport layers with IP network protocol communications and transport layers.

As well as defining the functions of signalling gateways and signalling gateway processes, the Sigtran documents referred to above specify in detail the protocols to be implemented between an SGP and an ASP in a single SGP environment.

To enhance the availability of the signalling gateway, it can be distributed over several processes running in one or several computers, each of them being a Signalling Gateway Process (SGP).

Every SGP belonging to a particular SG has the same SS7 point code (or the same list of PCs), with each SGP being connected to the SS7 network through redundant links.

On the IP side, each SGP is connected to the ASPs running the services. One AS, meaning one logical service, can be implemented by one or more processes or computers: the ASPs. To provide improved reliability, each SGP may be connected to each ASP through an SCTP association such that there is only one association between each SGP and ASP.

Protocol extensions and procedures have been proposed for implementing a fail-over mechanism between Stream Control Transfer Protocol (SCTP) associations connecting processes in the Application Servers and processes in the Signalling Gateways. They are defined by the IETF in a draft "*Correlation Id and Hearbeat Procedures (CORID) Supporting Lossless Fail-Over between SCTP Associations for Signalling User Adaptation Layers*" available from the IETF website at www.ietf.org. This fail-over mechanism requires both sides of the associations namely the AS and SG to use a parameter called correlation identification CORID that is added into messages exchanged between the Application Servers and Signalling Gateways. These messages are, for instance, ASP-ACTIVE, ASP-ACTIVE-ACK, HEARTBEAT and HEARTBEAT ACK messages.

The CORID ID is used by a traffic diversion procedure to ensure that no messages will be lost and that messages will delivered in sequence as is required by the standards.

SUMMARY OF THE INVENTION

In at least a preferred embodiment, this invention provides a method of controlling a local process that forms part of a first processing entity, said first processing entity maintaining a plurality of associations with a plurality of remote processes in a second processing entity, said method comprising the steps of: receiving a failure message from a remote process indicating a fault affecting an association linking the local process with that remote process; queueing data messages destined for that remote process; controlling the transmission of an acknowledgement of the failure message so that data messages pending on the association are received at that remote process before the acknowledgment of the failure message; and initiating a traffic diversion to set up an alternate path between said first processing entity and said second processing entity for queued data messages.

The invention can be applied, for instance, to provide a failover mechanism where the first processing entity is a signalling gateway and the second processing entity is an application server. In such an application, the local processes can be signalling gateway processes having a common point code or set of point codes and the remote processes can be application server processes having a common routing key. The message indicating the fault can be, for instance, an ASP_INACTIVE or ASP_DOWN message and the acknowledgement being respectively an ASP_INACTIVE_ACK message or an ASP_DOWN_ACK message.

The controlling can comprise delaying the acknowledgment of the failure message, for a predeterminable time period, for instance. The delay can be determined by transmission and acknowledgment of a heartbeat message. Alternatively, the controlling may comprises sending the acknowledgement of the failure message on the data stream used for the data messages.

The first processing entity can maintain a plurality of associations between a plurality of local processes and a plurality of remote processes and the method can comprise informing other local processes of the fault so that such other local processes can avoid involving the failed association in traffic diversion procedures initiated by them.

In preferred embodiments the method comprises determining whether pending messages form part of a stateful transaction, as is the case for TCAP messages, and, if so, finding an alternative local process to provide an alternative path to the same remote process.

The method can comprise the initiating of a switch back procedure to include a new association linking a local process with a remote process;

In other aspects, the invention provides a computer program code element for controlling a local process using the above described methods and a signalling gateway comprising a plurality of local processes that are controlled using such methods.

BRIEF DESCRIPTION OF THE DRAWINGS

Preferred embodiments of the invention will now be described, by way of example only, with reference to the accompanying drawings in which:

FIG. 1-B shows a basic configuration of the different layers of the layered protocol communications schemes of a Signalling End Point, a Signalling Gateway Process and an Application Server Process.

FIG. 4 illustrates an example of the implementation of routing tables in an environment of two-SGPs showing the association SGP-ASP before failure.

FIG. 5 illustrates an example of the implementation of routing tables in an environment of two-SGPs showing the association SGP-ASP after failure.

DETAILED DESCRIPTION OF THE PREFERRED EMBODIMENTS

Throughout the specification, and in the claims, the term "application server process" refers to a piece of hardware, such as a computer or server, running software to perform a task and communicating with other devices and/or programs over a communication channel. Further, reference to an "application service" means a software program running on hardware (an application server process) to perform a task related to the telephone network, such as (but not limited to) toll free number translation, maintaining home location registers, and maintaining visitor location registers.

Figure 1A:
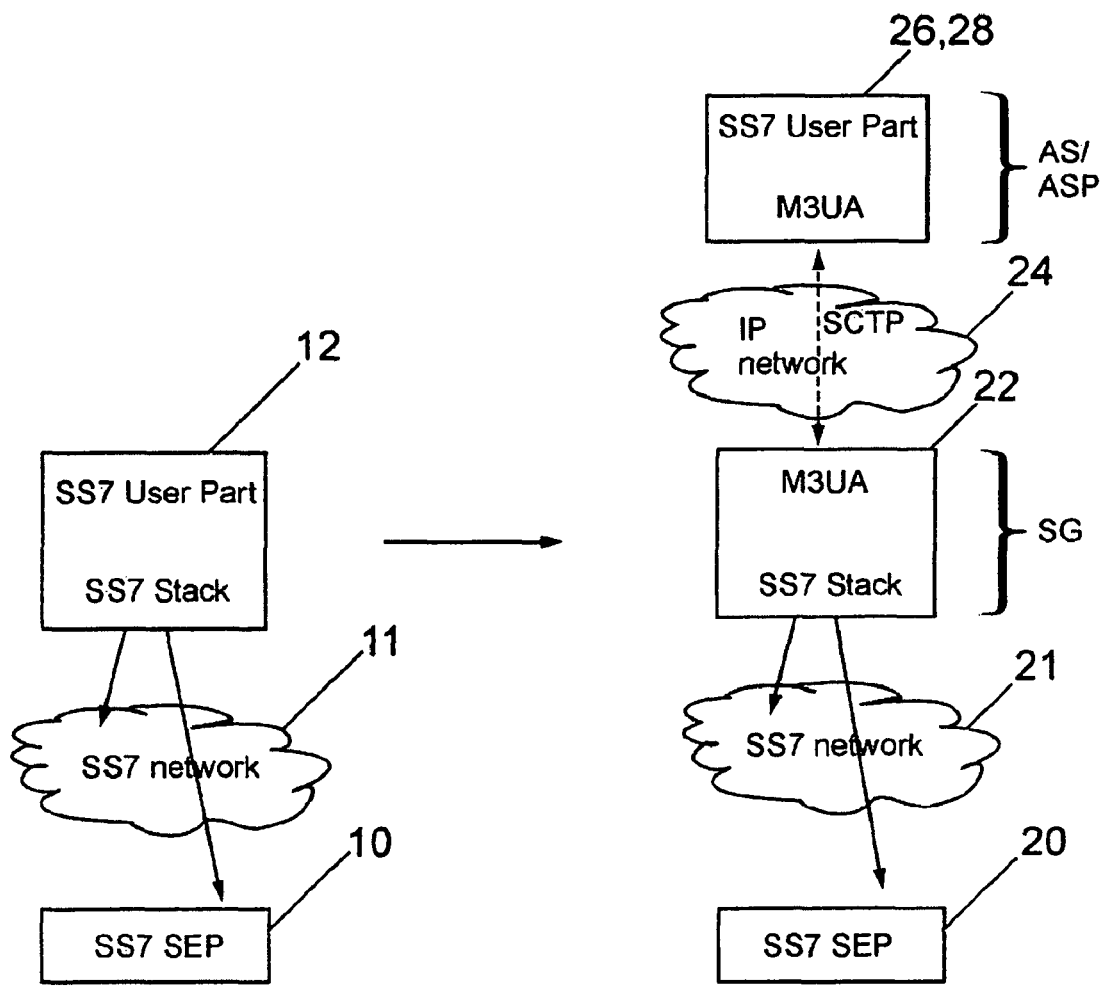
FIG. 1-A shows a prior art system operating under the SS7 protocol and its migration to an IP network.
Figure 1B:
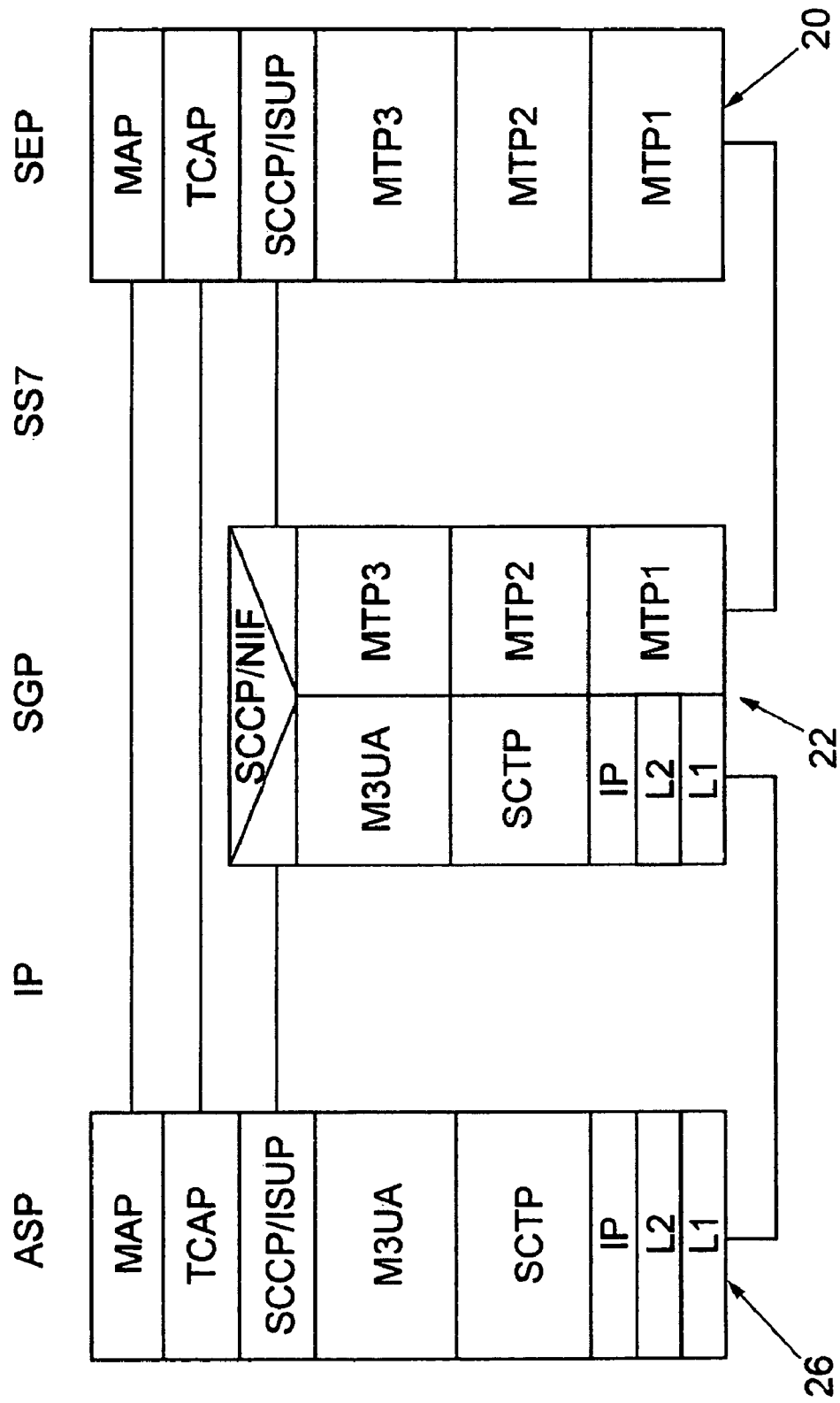
Figure 2:
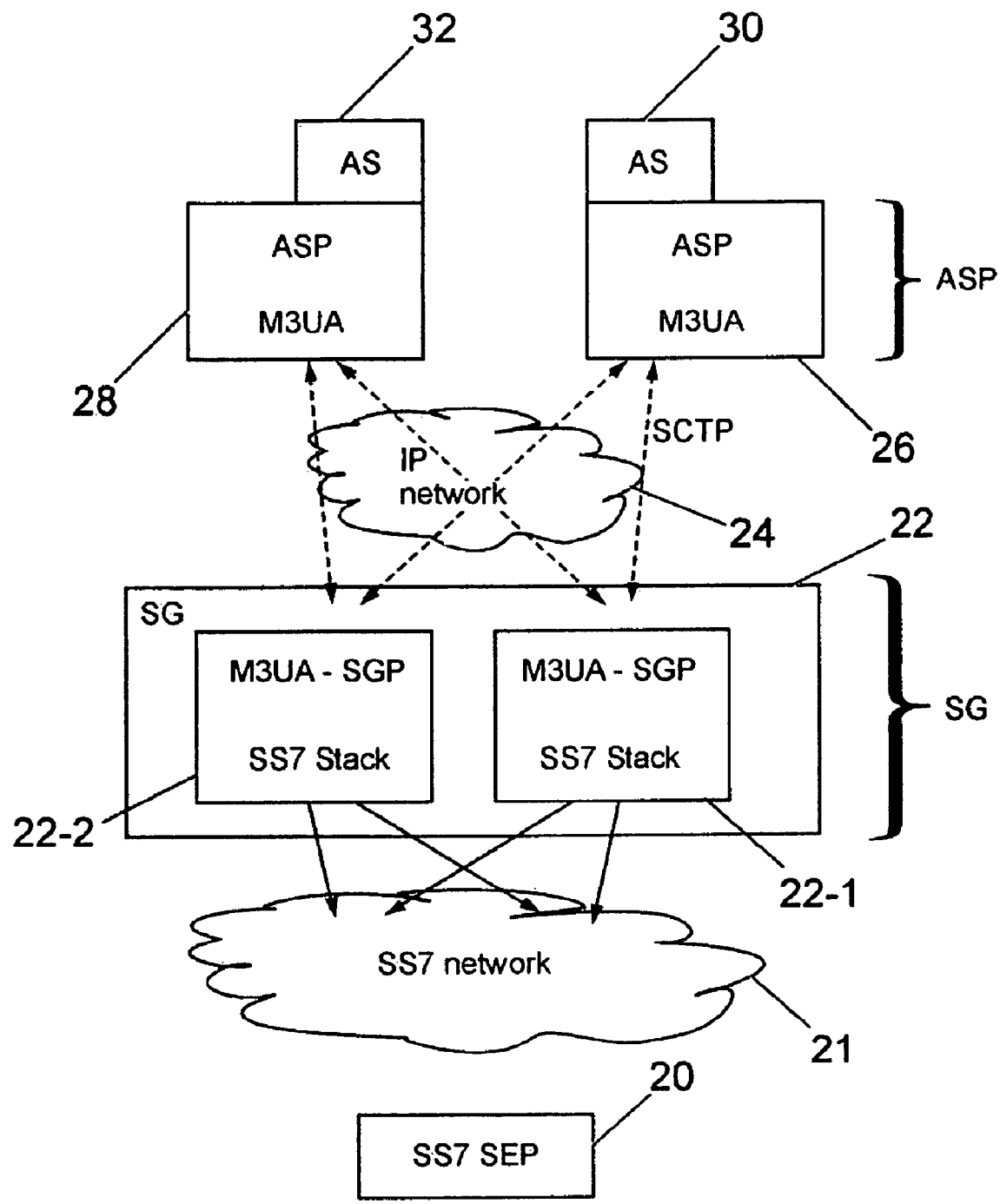
FIG. 2 shows one embodiment of a distributed signalling gateway environment in which the present invention is implemented.

FIG. 2 shows a distributed SGP signalling gateway 22 configured according to an embodiment of the present invention to enhance the availability of the signalling gateway. Indeed it is possible to distribute several Signalling Gateway Processes (SGPs) in one or more computers. An SGP is a process instance of a Signalling Gateway. It serves as an active backup, a load-sharing or a broadcast process of the Signalling Gateway. Each Signalling Gateway Process 22-1, 22-2 belonging to the same Signalling Gateway 22 has the same SS7 point code (or the same list of PCs). A signalling gateway appears to the SS7 network as an SS7 signalling point. Each Signalling Gateway Process 22-1, 22-2 can be connected to the SS7 network 21 through redundant links and is actively processing the traffic over the network.

On the Internet Protocol network 24 side, each Signalling Gateway Process 22-1, 22-2 is connected to the Application Server Processes 26, 28 running the application services. Each Application Server 30, 32, meaning each logical service, can be played by one or several Application Service Processes 26, 28. To provide improved reliability, each Signalling Gateway Process 22-1, 22-2 may be connected to each Application Service Process 26, 28 through many Stream Control Transfer Protocol SCTP associations. Each association is defined as a transport connection between a Signalling Gateway Process SGP and an Application Server Process ASP.

In order to build a more reliable distributed system, the different causes of failure need to be analyzed and procedures defined to recover from each of these failures.

The SS7 standards and the Sigtran IETF documents have defined recovery procedures for three cases of failure in a distributed SGP environment.

Any failure of the SS7 links between an SGP and the 1st SS7 network node (Signalling Transfer Point) can be recovered by using the procedures as defined for layers MTP2 and MTP3.

Any failure of any Signalling Gateway Process in the Signalling Gateway respectively with can be recovered on the SS7 side and the Sigtran side respectively by SS7 standards and by Sigtran IETF documents as defined in the ASP procedure.

Any failure of an Internet Protocol/Local Area Network interface of a Signalling Gateway Process can be recovered by Signalling Control Transfer Protocol multi-homing support However, in a distributed SGP environment, there are two cases of failures for which the SS7 standards the Sigtran IETF documents are silent. The SS7 network does not have a transport layer which allows the re-sequencing of messages. Therefore, if a path were to be changed, it is important to check that messages are not duplicated nor lost, and that messages initially transmitted are sent before starting to buffer new incoming messages in each SGP. In a distributed SGP environment, when these two failures occur, there is a need to define not only a traffic diversion procedure but also a switch back procedure in order to recover. These two cases of failure are as follows:

Failure of an SCTP association between a Signalling Gateway Process and an Application Server Process.

Failure of all associations between one Signalling Gateway Process and an Application Server.

Traffic between a Signalling Gateway Process and an Application Server Process can stop for three reasons:

An SCTP association completely fails. However this should be rare owing to the SCTP multi-homing feature. As a matter of fact, the SCTP multi-homing aims at managing the physical interfaces and allocating associations to these interfaces. Should this failure occur however, messages will be lost and will not be recovered.

An Application Server Process sends a Sigtran ASP DOWN message. In this case, all data traffic will be closed as soon as the Signalling gateway returns an ASP DOWN ACK message.

An Application Server Process sends a Sigtran INACTIVE message. In his case, all data traffic to the concerned Application Server will be closed as soon as the Signalling Gateway returns an ASP INACTIVE ACK message.

Figure 8:
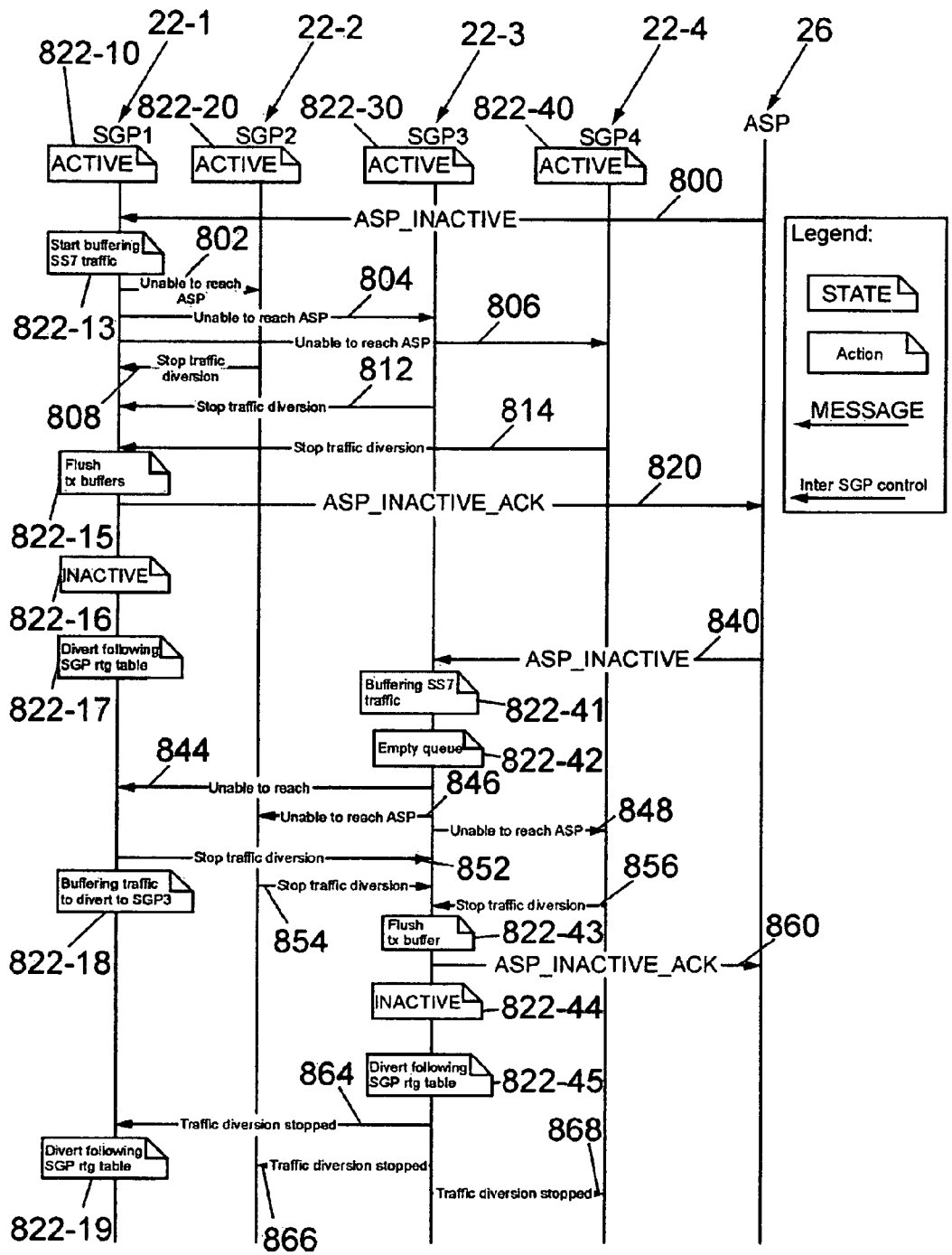
FIG. 8 shows an example of an inter-SGPs communication flow in case of a traffic diversion procedure in an environment of four-SGPs.
Figure 9:
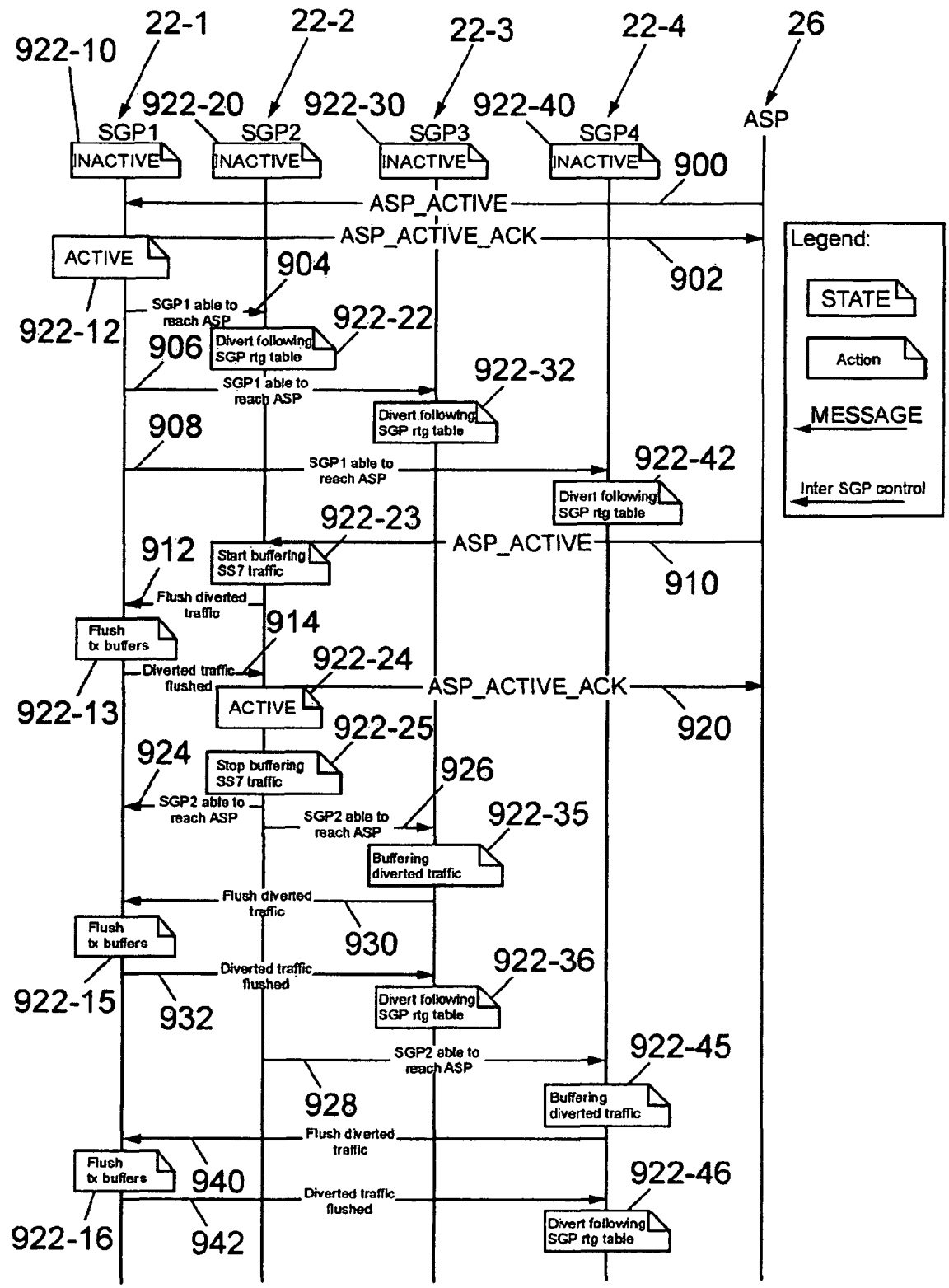
FIG. 9 shows an example of an inter-SGPs communication flow in case of a switch back procedure in an environment of four-SGPs.

The recovery procedures in the last two cases are set out in more detail in the inter-SGP communication flows of FIGS. 8 and 9.

Figure 3:
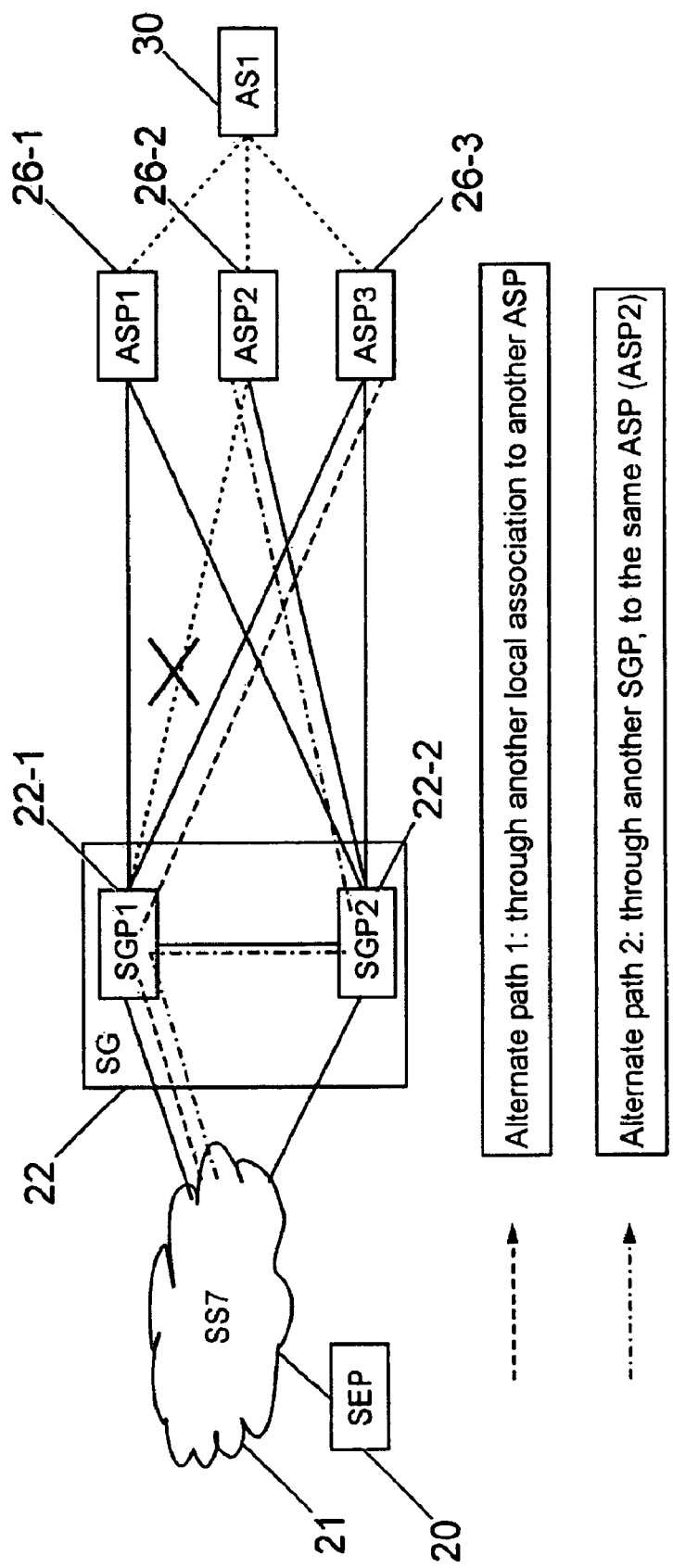
FIG. 3 illustrates a block diagram of one example of a traffic diversion algorithm example in a two-SGPs environment showing the search for an alternate path.

FIG. 3 is a block diagram of an example of a traffic diversion algorithm in a two-SGP environment showing the search for an alternate path. A Signalling End Point 20, which could be a telephone switch for instance if the system were to be implemented for residential or commercial telephone service, is connected to a SS7 network 21. Only one such Signalling End Point 20 is shown in FIG. 3 for simplicity of the drawing; however, it will be understood that many other Signalling End Points may be coupled to an Application Server 30, through other Signalling Gateways.

The Application Server 30 is preferably adapted to communicate with a plurality of Application Server Processes 26-1, 26-2, 26-3 referred as ASP1, ASP2, ASP3. Those ASPs are preferably connected to a Signalling Gateway 22 over an Internet Protocol network 24 as is also shown in FIG. 2. While only three Application Server Processes ASP1, ASP2, ASP3 are shown in FIG. 3 for simplicity, any number of application server processes may be connected to the Application Server 30 or associated with as many Signalling Gateway Processes as may be required. Communications between Signalling End Point 20 and Signalling Gateway 22 over the SS7 network, as well as communications between Signalling Gateway 22 and Application Server Processes over the IP network are known by those of ordinary skilled in the art and therefore need not be described in greater detail.

Still referring to FIG. 3, Application Server Processes referred to as ASP1, ASP2, ASP3 26-1, 26-2, 26-3 are running on an Application Server AS1 30 and distributing signalling messages from Signalling Gateway 22 to any number of Application Server Processes. For clarity in the present invention, the term "AS1" may be expressed simply as "AS", but it should be kept in mind that a plurality of ASs may also be implemented which would create therefore different subgroup of Application Server Processes. While FIG. 3 shows communications between a single Signalling Gateway 22 composed of two SGPs 22-1, 22-2 and a subgroup of Application Server Process 26 composed of three ASPs 26-1, 26-2, 26-3, it will be that, depending on the required complexity of the SS7 and IP networks, additional SGPs or ASs, or ASPs may be included. In particular, the FIGS. 4 to 11 show different the situation where a signalling gateway is composed of four SGPs communicating with an ASP2 of an Application Server AS1 30

In the configuration as shown in FIG. 3, it is assumed that each Signalling Gateway Process 22-1, 22-2 of a Signalling Gateway 22 is connected to each Application Server Process 26-1, 26-2, 26-3 of an Application Server. This is not required but improves performance, in that every message received by an SGP from the SS7 network 21 can be forwarded directly to its destination ASP/AS without SGP to SGP traffic under normal circumstances.

Figure 10:
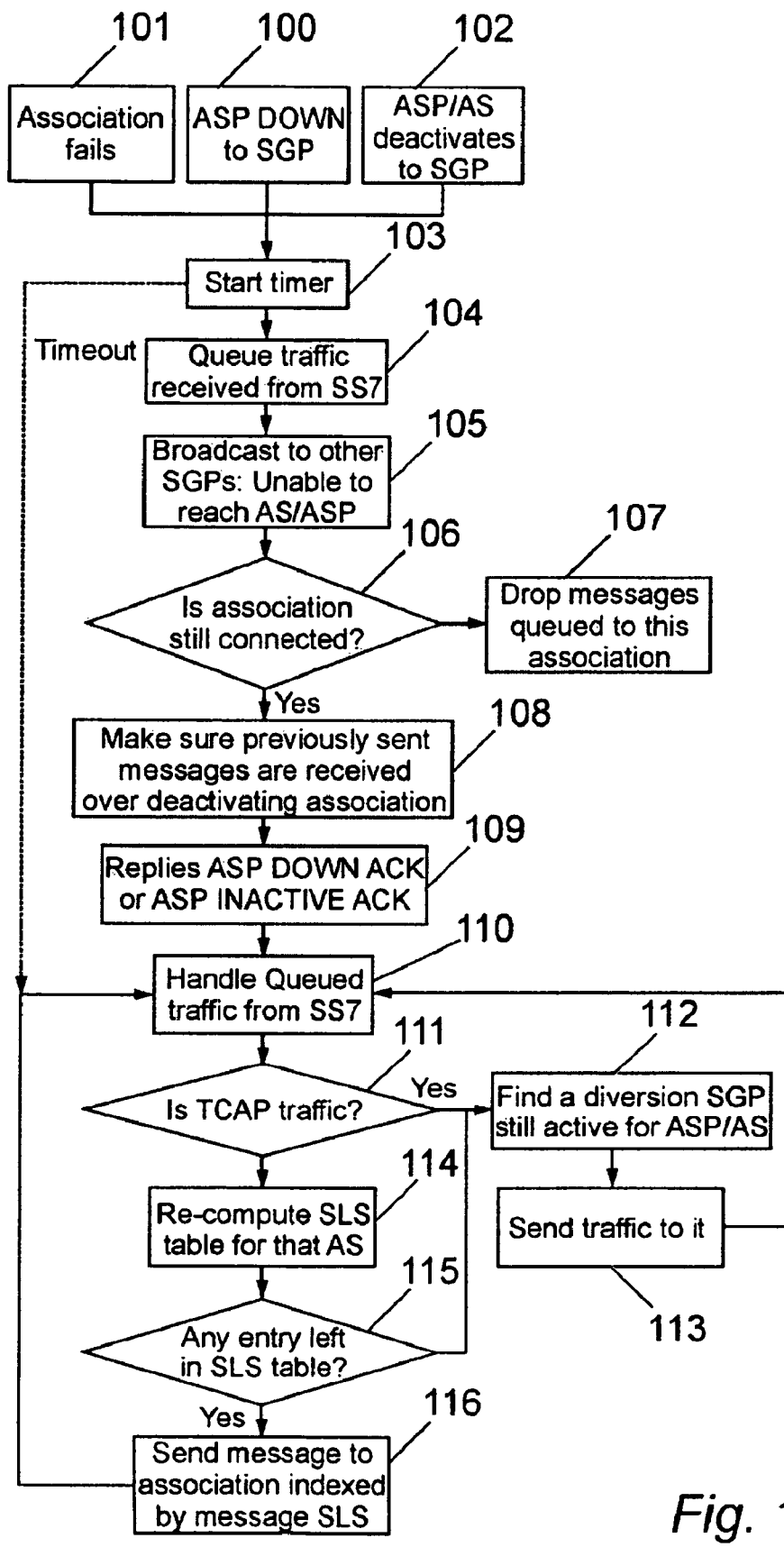
FIG. 10 shows a flow diagram of one example of a traffic diversion algorithm.

A detailed flow diagram of a traffic diversion algorithm is shown in FIG. 10 and the main steps of a traffic diversion algorithm will be described in connection with the block diagram of FIG. 3 in the case where an association fails. In this particular embodiment, it is assumed that an association SGP1-ASP2 fails for any of the three reasons previously mentioned. This failure triggers a traffic diversion to begin so that the Signalling Gateway Process 22-1 performs the following recovery steps:

A timer is started which protects the overall switch-over procedure, as represented at step 103 in FIG. 10;

traffic received from SS7 network, and directed to this ASP (ASP2), is blocked. The messages are then stored and queued in sequence, at step 104 in FIG. 10;

every other SGPs is informed that SGP1 can no longer reach ASP2/AS1, so SGP1 can no longer be used by other SGPs for diverted traffic to ASP2/AS1, at step 105 in FIG. 10;

a test is carried out to establish whether the association is still physically connected, at step 106, since it is assumed that nothing can be done to recover from a physical break of a optical fiber or a wire. In such a case, messages queued for this association are dropped at step 107;

It is verified that peer ASP has received every message previously sent on this association, at step 108 in FIG. 10 (this step will be detailed further below);

An alternate path is identified to forward subsequent messages that have been queued to the destination service or Application Server, at steps 110 to 115 in FIG. 10 (this step will be detailed further below). The method used to find an alternate path depends on whether the traffic is TCAP data that might form part of a stateful transaction and thus need to be sent to the same ASP in order to further a pending transaction or non-TCAP data, which can be assumed to be stateless and therefore can be sent to any of the ASPs.

Therefore, there are two alternate paths:

Alternate path 1 for non-TCAP data: through another local association, meaning through an alternate Application Server Process ASP3 26-3 which serves the same AS. As is shown in FIG. 3, the first alternate path is from the SS7 network 21 to SGP1 22-1, then to ASP3 26-3.

Alternate path 2 for TCAP data: through an alternate Signalling Gateway Process SGP2 22-2 still connected to Application Server Process ASP2 26-2, meaning through the same Application Server Process ASP2 26-2. As is shown in FIG. 3, the second alternate path is from the SS7 network 21, SGP1 22-1 to SGP2 22-2 then to ASP2 26-2.

Messages are sent to an association indexed by messages SLS according to the SLS routing table, at steps 116 and 113.

Figure 11:
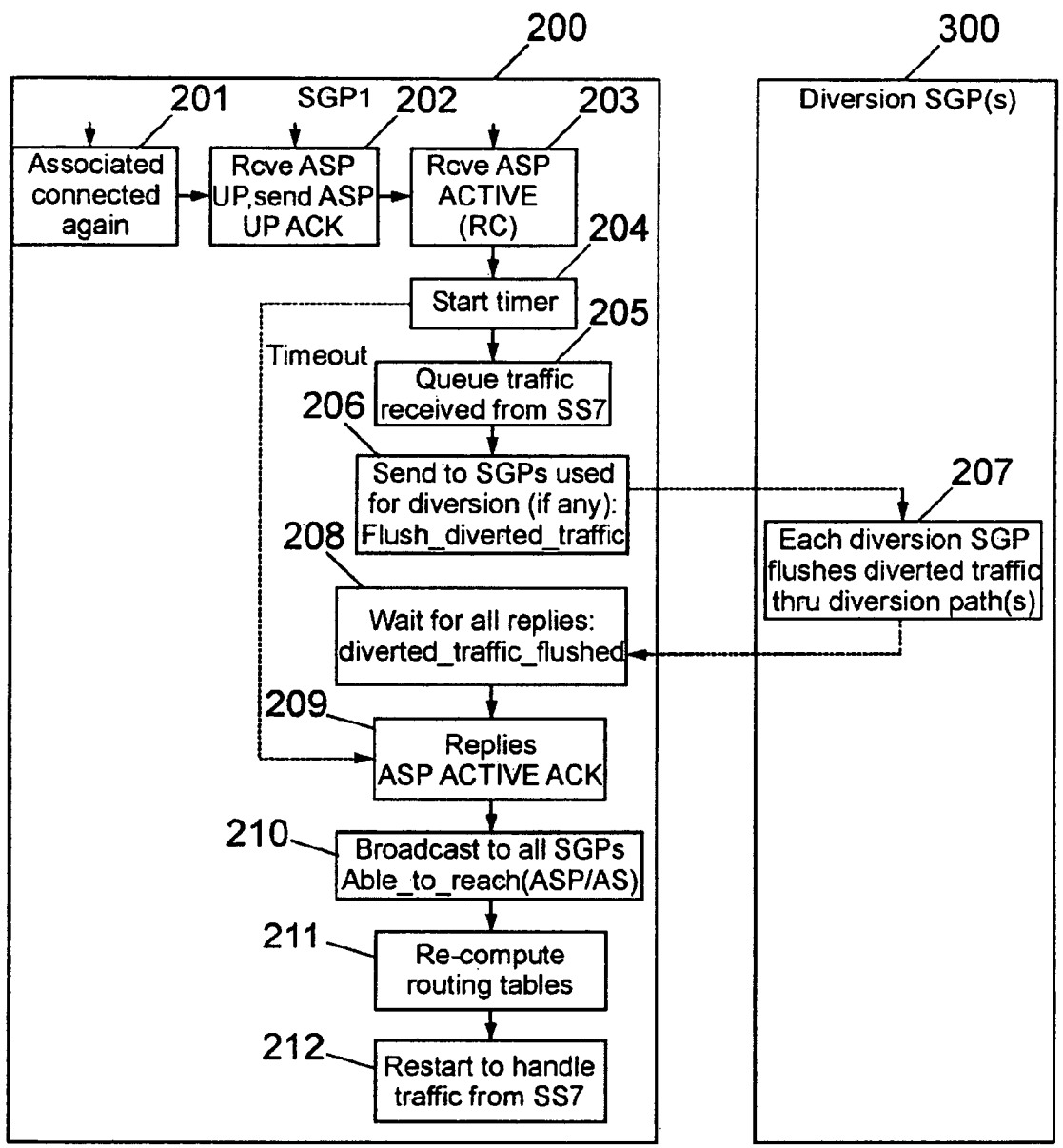
FIG. 11 shows a flow diagram of one example of a switch back algorithm.

When an association is re-established, a switch back algorithm can begin. A detailed flow diagram of a switch back algorithm is shown in FIG. 11 and the main steps of a switch back algorithm will be described in connection with the block diagram of FIG. 3. In this particular case when association SGP1-ASP2 is restored, the Signalling Gateway Process 22-1 handling the association performs the following recovery steps:

A timer is started which protects the overall switch back procedure, as represented at step 204 in FIG. 11;

Traffic received from SS7 network, and destined to this ASP (ASP2) is blocked. These messages are queued, at step 205;

It is verified that every diverted message has been received by the ASP diversion path, at steps 206 to 208. This may require inter-SGP communication to wait for every diversion SGP to confirm that diverted messages have been sent in order to reply to the ASP with an ASP_ACTIVE_ACK at step 209;

Other SGPs are informed that SGP1 can reach ASP2/AS1 again. Henceforth, SGP1 can be used by other SGPs to divert traffic to ASP2/AS1, at step 210; and Traffic is switched back to a new association, at steps 211 and 212.

In order to describe the steps of verifying peer ASP receives every transmitted message, a thorough description of the traffic diversion and switch back algorithms will now follow referring respectively to FIGS. 10 and 11.

FIG. 10 is a flow diagram of a traffic diversion algorithm that is carried out when an ASP_DOWN message is sent to an SGP at step 100, an association fails at step 101, or an ASP_INACTIVE message is sent to an SGP at step 102. Further to the occurrence of any of these three cases, a protection timer set to a predetermined value is started at step 103. In response to this message signal, the SGP starts buffering the messages received from the SS7 network by queuing them according to the order they are received at step 104. Following this action, the SGP broadcasts to other SGPs that it is unable to reach the corresponding AS/ASP at step 105 to which other SGPs immediately reply with a Stop Traffic Diversion inter-SGP control signal.

The SGP then tests if the whole association is still connected at step 106. If not it will drop all messages queued to this association at step 107. However, as previously discussed, this case should hardly ever occur owing to the SCTP multi-homing as defined in the M3UA standards.

At step 108, the SGP verifies that the messages previously sent using the deactivated association have been received in sequence by the ASP/AS, that no data messages have been lost or duplicated. When the remote ASP sends an ASP_DOWN or ASP_INACTIVE message, the ASP can still process the data messages that are being transmitted (or still in the IP stack transmit buffers). The SGP ensures that the acknowledge message ASP_DOWN_ACK or ASP_INACTIVE_ACK are not returned to the ASP after all messages have been transmitted to the ASP/AS. This is possible if the data messages are not using the same SCTP streams as the control messages. Three possible implementations can be used in order to ensure that the ASP/AS receives all messages in sequence before sending acknowledgement messages ASP_DOWN_ACK or ASP_INACTIVE_ACK:

Delay acknowledge messages (ASP_DOWN_ACK or ASP_INACTIVE_ACK) for a certain predetermined time;

Send ASP_INACTIVE_ACK message on the same stream used for sending data messages to the deactivated ASP. In this case, it is unlikely that the ASP_INACTIVE_ACK message will arrive at the ASP before the data messages so that the ASP can process in sequence the data messages first, then the ASP_INACTIVE_ACK message; or Send Sigtran HEARTBEAT messages and wait for the HEARTBEAT_ACK messages, and only then send the ASP_DOWN_ACK or ASP_INACTIVE_ACK.

Once all the previously sent messages of the deactivating association have been received in sequence by the ASP/AS, an ASP_DOWN_ACK or ASP_INACTIVE_ACK message can be returned from the SGP to the ASP at step 109. The protection timer set at step 103 is set so as to give enough time to cover the traffic diversion procedure from steps 104 to 109. Should the timer expire before reaching step 110, the traffic diversion procedure loops directly to step 110 where the SGP handles queued messages received from SS7 network.

As previously mentioned, the step of finding an alternate path depends on the type of traffic (TCAP or non-TCAP). After handling queued traffic from the SS7 network at step 110, a test is performed at step 111 in order to detect whether the traffic relates to a TCAP or non-TCAP message transaction. If it is TCAP traffic, the SGP needs to find an active diversion SGP for ASP/AS at step 112 for transmitting traffic at step 113. If it is non-TCAP traffic, the SLS routing table is then recomputed for that AS at step 114. Furthermore, the system tests whether there is not entry left in the SLS routing table i.e. active associations, the system loops back to step 112. If there are still entries left in the SLS routing table, the SGP sends messages to association indexed by message SLS at step 116 and loops back to handle queued traffic from the SS7 network at step 110.

The handling of non-TCAP traffic is better illustrated in FIGS. 4 and 5 which show how the SLS routing tables in SGP1 and SGP2 are computed following an association failure SGP1-ASP2, FIG. 4 showing the SLS table before the failure SGP1-ASP2 and FIG. 5 showing the SLS table after the failure.

For non-TCAP data, it is sufficient to forward data to an alternate ASP serving the same AS. In the case shown in FIG. 4, SGP1 can select another association with the alternate ASP2, and forward the traffic to that alternate ASP2. When there are several alternate ASPs, it is better to dispatch to each of them a subset of the diverted messages. For SCCP class 1 messages (and even class0 messages), the SLS routing table kept for each AS must be re-dispatched to the associations of the active ASPs attached to the AS, such as ASP1 and ASP3 in the example shown in FIG. 5.

To summarize, the state of the SLS routing table before the failure of SGP1-ASP2 association in FIG. 4 is as follows:

|  | ASP1 | ASP2 | ASP3 |
| --- | --- | --- | --- |
| SGP1 | 1 4 7 ... | 2 5 8 ... | 3 6 9 ... |
| SGP2 | 1 4 7 ... | 2 5 8 ... | 3 6 9 ... |

The state of the SLS routing table after the failure of SGP1-ASP2 association in FIG. 5 is as follows:

|  | ASP1 | ASP2 | ASP3 |
| --- | --- | --- | --- |
| SGP1 | 1 2 4 5 7 ... |  | 3 6 8 9 ... |
| SGP2 | 1 4 7 ... | 2 5 8 ... | 3 6 9 ... |

If SGP1 were to lose all associations with every ASP serving AS1, it must divert the messages destined to AS1 though another SGP. This case would be similar to the case of TCAP data as described hereafter.

Should the SGP1-ASP2 association be re-established, SGP1 checks first that diverted traffic has been received by other ASPs (ASP1 and ASP3). In that respect, it has to ensure that peer ASPs (ASP1 and ASP3) receive all transmitted messages in each backup association SGP1-ASP1 and SGP1-

ASP3. Afterwards, SGP1 can re-compute the SLS routing table, and restart the traffic distribution to ASP2/AS1 as is shown at step 211 in FIG. 11.

Figure 6:
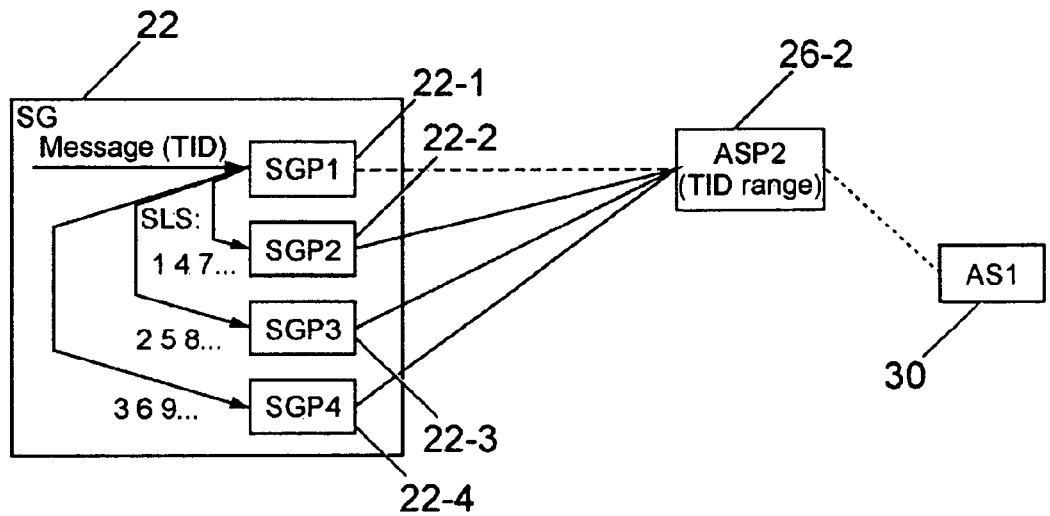
FIG. 6 illustrates a TCAP traffic diversion in case of one failure in an environment of four-SGPs.
Figure 7:
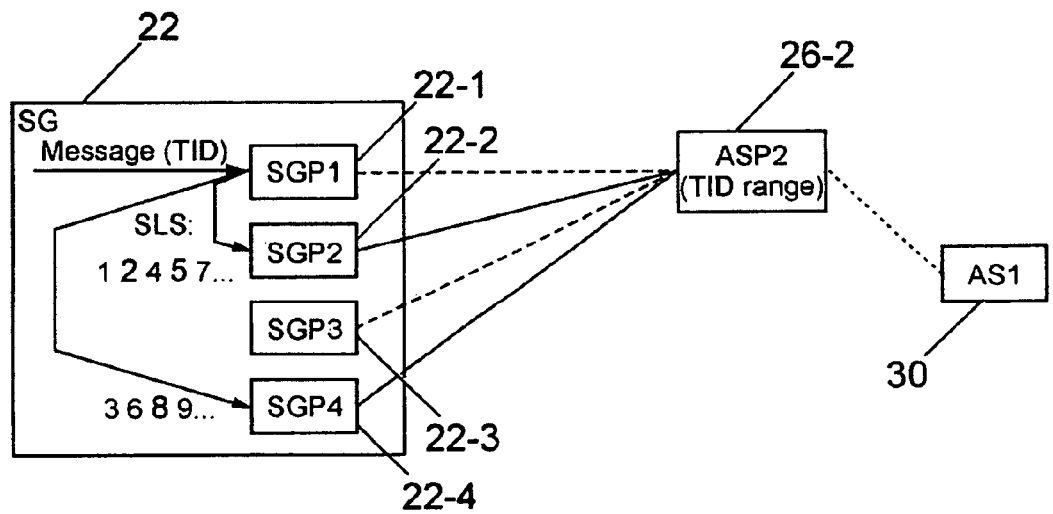
FIG. 7 illustrates a TCAP traffic diversion in case of two failures in an environment of four-SGPs.

For TCAP data, it is important to distribute all messages relating to a single transaction to the same ASP. This is mandatory for SUA. Thus it is even required that messages of TCAP transactions be dispatched to the ASPs according to their local Transaction Id TID. Each ASP (serving an AS) is identified and activated for a range of specified TIDs. FIGS. 6 and 7 show that ASP2 is identified with a predetermined TID range so that messages within this TID range are effectively received by ASP2. The configuration in FIGS. 6 and 7 is the same as in FIGS. 4 and 5, except that data are TCAP type and that Signalling Gateway 22 is composed of 4 SGPs, SGP1 to SGP4.

When the SGP1-ASP2 association fails, messages received from the SS7 network, and identified with the TID range corresponding to ASP2, must be diverted to SGP2 and then forwarded onto the SGP2-ASP2 association. If several SGPs can still reach ASP2, the diverted traffic can be dispatched to them according to the SLS routing table:

Before the failure of the SGP3-ASP2 association, the state of the SLS routing table is as follows:

| SGP1-SGP2 | SGP1-SGP3 | SGP1-SGP4 |
|---|---|---|
| 1 4 7 . . . | 2 5 8 . . . | 3 6 9 . . . |

As is shown in FIG. 7, if one of the other SGPs loses its association with ASP2, for instance association SGP3-ASP2, it broadcasts this information to other SGPs. This information is used by the SGPs that are currently diverting traffic to the failed SGP. These SGPs must reallocate the SLS routing table to other SGPs that are still able to reach the ASP. The state of SLS routing table after this additional failure of SGP3-ASP2 association is as follows:

| SGP1-SGP2 | SGP1-SGP3 | SGP1-SGP4 |
|---|---|---|
| 1 2 4 5 7 . . . |  | 3 6 8 9 . . . |

Should the SGP1-ASP2 association be re-established, SGP1 must check first that the diverted traffic has been entirely received by the ASP2. In that respect, it has to ensure that ASP2 has received all transmitted messages in each backup association SGP2-ASP2 and SGP4-ASP2. Once this has been verified, SGP1 can re-compute the SLS routing table, and restart traffic distribution to ASP2/AS1 as is shown at step 211 in FIG. 11.

FIG. 11 is a flow diagram of a switch back algorithm that is applied whenever an association has been re-established at step 201, followed by an ASP_UP message sent by the ASP and received by an SGP acknowledging with an ASP_UP_ACK message at step 202, further followed by an ASP_ACTIVE message sent by the ASP and received by the same SGP at step 203. Following the reception of the ASP_ACTIVE message, a protection timer is started at step 204 and messages received from the SS7 network are queued at step 205 in order to block traffic between SS7 network and the corresponding ASP. Afterwards, the newly activated SGP has to ensure that all diverted messages have been received by the ASP according to the former routing table. Therefore, at step 206 the SGP whose association has been newly activated sends to other active SGPs or diversion SGPs a "Flush diverted traffic" inter-SGP control signal. Upon reception of this control signal, these active SGPs or diversion SGPs start flushing diverted traffic through diversion path(s) at step 207 until the last message has been received by the ASP. A "Diverted traffic flushed" inter-SGP control signal is then sent from each active SGP or diversion SGP at step 208.

Once the newly activated SGP has received from all active SGPs or diversion SGPs the control signal "Diverted traffic flushed", it replies to the ASP with an ASP_ACTIVE_ASK message at step 209. The protection timer set at step 204 is set so as to allow enough time to cover the switch back procedure from steps 204 to 209. Should the timer expire before reaching step 209, the switch back procedure loops directly to step 209 where the SGP replies to the ASP with an ASP_ACTIVE_ASK message.

Then, the newly-activated SGP can broadcast to all SGPs an inter-SGP control signal "Able to reach ASP/AS" at step 210. Following this control signal, the SLS routing tables are then recomputed at step 211 and the messages from the SS7 network are then processed normally using the newly updated SLS routing table at step 212.

In order to control the communications between SGPs and to interface with ASPs, Inter-SGP communications are used. Before describing examples of inter-SGP communication flows for a traffic diversion and a switch back in an environment of four-SGPs, as are shown in FIGS. 8 and 9, some basic functions and principles of inter-SGP communication will be described.

Inter-SGP communications enable the transmission of diverted data traffic between SGPs. In addition to this primary function, inter-SGP communications also allow the distribution of information between the SGPs. All SGPs of one SG share a common database that contains the AS/ASP activation states for each SGP. Finally, inter-SGP communications are aimed at synchronizing traffic diversion and switch back procedures between SGPs.

Therefore, there are six different types of inter-SGP control signals that are used in order to control inter-SGP communications. Each time that an SGP is deactivated, it broadcasts an "Unable to reach ASP/AS" control signal to other SGPs within the same AS. This control signal is aimed at informing other SGPs of the ASP deactivation for the purpose of updating the routing table of an AS. A "Stop traffic diversion" control signal is then returned from all other SGPs to confirm they no longer use the failed SGP to divert traffic, as was previously highlighted in the description of the traffic diversion procedure. Once the SGP of the failing association has completed flushing its transmission buffers and sent ASP-DOWN-ACK or ASP-INACTIVE-ACK messages, it sends a "Traffic diversion stopped" control signal to the other SGPs so that the other SGPs that were using the SGP of the failing association to divert traffic can start sending traffic on an alternate diversion path. Furthermore, this control signal allows recovery from multiple association failures. This control signal is used to ensure that messages are received in sequence at the ASP.

Should a switch back procedure be initiated after a failure of an association, or an SGP be activated, the corresponding SGP sends an "SGP able to reach ASP/AS" control signal to broadcast to other SGPs the ASP activation for the purpose of updating the routing table of an AS. After updating the routing table, a "Flush diverted traffic" control signal is sent from each SGP that is still not able to reach the AS to their respective diversion SGPs to request that previous messages are effectively sent to the ASP before using the new route for transmitting messages. This "Flush diverted traffic" control signal is required in order to ensure that messages are received in sequence at the ASP. Following this "Flush diverted traffic" control signal, each receiving SGP starts the operation of Flushing transmission buffers until the last message is sent. Once this is done, each receiving SGP returns a "Diverted traffic flushed" control signal.

FIG. 8 illustrates an example of an inter-SGP communication flow in case of a traffic diversion procedure in an environment having four-SGPs 22-1, 22-2, 22-3, 22-4. These SGP1 to SGP4 22-1, 22-2, 22-3, 22-4 are in ACTIVE states 822-10, 822-20, 822-30 and 822-40 and are connected to an Application Server Process ASP 26. ASP2 herein referred as ASP 26 acts as a single application server process with a predetermined TID range in connection with signalling gateway 30. This FIG. 8 exemplifies a set of inter-SGP control signals and messages exchanged as ASP 26 begins deactivating a Signalling Gateway Process and more specifically SGP1. As is shown in FIG. 7, we can assume that the association SGP1-ASP2 is inactive which requires ASP 26 to send an ASP_INACTIVE message 800 to SGP1 22-1. Further to this message, SGP1 22-1 starts buffering messages received from the SS7 network for ASP 26 at step 822-13 and sends a set of "unable to reach ASP" inter-SGP control signals 802, 804, and 806 respectively to SGP2 22-2, SGP3 22-3 and SGP4 22-4 specifying that SGP1 is unable to reach ASP 26. In return, SGP2, SGP3 and SGP4 respond with "Stop traffic diversion" inter-SGP control signals 808, 812, 814 to SGP1 that they stop traffic diversion to SGP1. In response to these control signals, SGP1 22-1 flushes its transmission buffers at step 822-15, meaning that SGP1 ensures that previous transmitted messages for ASP 26 have been received by the Application Server Process. Afterwards, SGP1 sends an ASP_INACTIVE_ACK message 820 to ASP 26.

Once the ASP_INACTIVE signal has been acknowledged by SGP1 22-1, SGP1 can set its status to INACTIVE at step 822-16 and start diverting the traffic using the newly updated SGP routing table at step 822-17.

In the meantime, ASP 26 has sent an ASP_INACTIVE message 840 to SGP3 22-3. Following which, SGP3 starts buffering the messages received from SS7 traffic at step 822-41 and emptying its inter-SGP communication queue at step 822-42. SGP3 22-3 will continue processing this inter-SGP communication queue until it receives "stop traffic diversion" control signals from all SGPs. In order to inform other SGPs that SGP3 is unable to reach ASP 26, SGP3 sends a set of inter-SGP control signals "Unable to reach ASP" 844, 846, 848 respectively to SGP1, SGP2 and SGP 4. In return, SGP1, SGP2 and SGP4 respond with inter-SGP control signals 852, 854, and 856 to SGP3 that they stop the traffic diversion to SGP3. In this particular case, while SGP1 is buffering traffic diverted to SGP3 at step 822-18, SGP3 22-3 is flushing its transmission buffers at step 822-43 to ensure that previous transmitted messages for ASP 26 have been received by the Application Server Process. Once the last message has been transmitted, SGP3 22-3 sends an ASP_INACTIVE_ACK message 860 to ASP 26 and sets its status to INACTIVE at step 822-44. Afterwards, SGP3 stops buffering messages received from the SS7 network and starts diverting traffic using the newly updated SGP routing table at step 822-45.

Then, SGP3 can send a set of "Traffic diversion stopped" inter-SGP control signals 864, 866, and 868 respectively to SGP1, SGP2 and SGP4 to inform them that traffic diversion can start using the newly updated routing table. Once SGP1 receives the "Traffic diversion stopped" control signal 864, it starts diverting the traffic using effectively the SGP routing table at step 822-19.

FIG. 9 illustrates an example of an inter-SGP communication flow in the case of a switch back procedure in an environment of four-SGPs 22-1, 22-2, 22-3, 22-4. Initially, these SGP1 to SGP4 are INACTIVE respectively at steps 922-10, 922-20, 922-30 and 922-40 and are connected to an Application Server Process ASP 26. As in FIG. 8, ASP2 herein referred as ASP 26 acts as a single application server process with a predetermined TID range in connection with signalling gateway 30. However, this FIG. 9 exemplifies a set of inter-SGP control signals exchanged as ASP 26 begins activating Signalling Gateway Processes and more particularly SGP1 22-1 and SGP2 22-2.

ASP 26 starts sending an ASP_ACTIVE message 900 to SGP1 22-1. Further to this message, SGP1 22-1 responds with an ASP_ACTIVE_ACK message 902 to ASP 26 before setting its status to ACTIVE at step 922-12. In order to inform other SGPs that its status has been activated, SGP1 sends respectively a set of "SGP1 able to reach ASP" inter-SGP control signals 904, 906, 908 respectively to SGP2, SGP3 and SGP4 that it is able to reach ASP 26. In response to each of these control signals, SGP2, SGP3 and SGP4 respectively start diverting the traffic using the newly updated SGP routing table at steps 922-22, 922-32 and 922-42.

In the meantime, ASP 26 has sent an ASP_ACTIVE message 910 to SGP2 22-2. SGP2 then starts buffering the messages received from SS7 traffic at step 922-23 and sends a "Flush diverted traffic" inter-SGP control signal 912 to SGP1 22-1 to ensure that all diverted messages have been received by the ASP diversion path, which corresponds to step 206 of FIG. 11. At the reception of this control signal, SGP1 starts flushing its transmission buffers at step 922-13, which corresponds to step 207 of FIG. 11. Once the last message has been flushed, SGP1 sends an inter-SGP control signal "Diverted traffic flushed" 914 to SGP2. This operation is also carried out for SGP3 22-3 and SGP4 22-4. Indeed, each of these SGPs respectively sends "Flush diverted traffic" inter-SGP control signals 930, 940 to SGP1 22-1, followed by the steps of flushing SGP1 transmission buffers at steps 922-15 and 922-16 and the response of inter-SGP control signals "Diverted traffic flushed" 932, 942 respectively to SGP3 and SGP4.

Once SGP2 receives the inter-SGP control signal "Diverted traffic flushed" 914 from SGP1, it acknowledges the ASP_ACTIVE by returning an ASP_ACTIVE_ACK to ASP 26, sets its status to ACTIVE at step 922-24 and stops buffering messages received from the SS7 network at step 922-25. Afterwards, SGP2 starts sending to all SGPs a set of inter-SGP control signals "SGP2 able to reach ASP" 924, 926, 928. Further to these control signals, SGP3 and SGP 4, which are still INACTIVE in the present case, start buffering diverted traffic at steps 922-35 and 922-45 until the SGP routing tables are updated before starting to divert messages at steps 922-36 and 922-46 according to the newly updated routing tables.

The above discussion is meant to be illustrative of the principles and various embodiments of the present invention. Numerous variations and modifications in each of the illustrated examples will become apparent to those skilled in the art once the above disclosure is fully appreciated. It is intended that the following claims be interpreted to embrace all such variations and modifications.

The invention claimed is:

1. A method of controlling a local process that forms part of a first processing entity, said first processing entity maintaining a plurality of associations with a plurality of remote processes in a second processing entity, said method comprising the steps of:

receiving at a computer executing the local process a failure message from a remote process in the second processing entity indicating a fault affecting an association linking the local process with that remote process;

queuing, at the computer executing the local process, data messages destined for that remote process, the data messages queued according to the order in which they are received at the computer;

controlling the transmission of an acknowledgement of the failure message at the computer executing the local process so that data messages pending on the association are ensured as received in sequence before acknowledgement of the failure message; and initiating a traffic diversion to set up an alternate path between said local process of said first processing entity and said second processing entity for queued data messages, with said initiating comprising testing of a data type value of the queued data messages and, based on the data type value test result, either finding an alternate local process for transmitting queued data messages to the remote process or forwarding data to an alternate remote process serving the remote processing entity.

2. A method as claimed in claim 1 wherein the controlling comprises delaying the acknowledgment of the failure message.

3. A method as claimed in claim 2 wherein the delay is for a predeterminable time period that estimates enough time for verifying.

4. A method as claimed in claim 2 wherein the delay is determined by transmission and acknowledgment of a heartbeat message.

5. A method as claimed in claim 1 wherein the controlling comprises sending the acknowledgement of the failure message on the data stream used for the data messages.

6. A method as claimed in claim 1 comprising testing the association to determine if the association is active and, if not, dropping messages queued for the association.

7. A method as claimed in claim 1 wherein the local process is one of a plurality of local processes of the first processing entity and each of the local processes is connected to each of the remote processes of the second processing entity through a plurality of associations.

8. A method as claimed in claim 7 comprising informing other local processes of the fault so that such other local processes can avoid involving the failed association in traffic diversion procedures initiated by those other local processes.

9. A method as claimed in claim 7 or claim 8 comprising determining whether pending messages form part of a stateful transaction, and, if so, finding an alternative local process to provide an alternative path to the same remote process.

10. A method as claimed in claim 9 wherein the determining comprises determining whether the messages are TCAP messages.

11. A method as claimed in claim 7 or claim 8 comprising determining whether pending messages form part of a stateless transaction, and, if so, finding an alternative path through the same local association to another remote process.

12. A method as claimed in claim 11 wherein the determining comprises determining whether the messages are non-TCAP messages.

13. A method as claimed in claim 1 wherein the traffic diversion comprises modifying routing tables.

14. A method as claimed in claim 1 wherein the first processing entity is a signalling gateway, the local processes being signalling gateway processes having a common point code or set of point codes.

15. A method as claimed in claim 1 wherein the second processing entity is an application server, the remote processes being application server processes having a common routing key.

16. A method as claimed in claim 15 wherein the message indicating the fault is an ASP_INACTIVE or ASP_DOWN message and the acknowledgement is respectively an ASP_INACTIVE_ACK message or an ASP_DOWN_ACK message.

17. A method as claimed in claim 1 further comprising the initiating of a switch back procedure to include a new association linking a local process with a remote process.

18. A method as claimed in claim 17 comprising informing other local processes of the new association so that such other local processes can begin involving the new association.

19. A method as claimed in claim 1 wherein the associations are SCTP associations.

20. A computer readable storage medium embedded with computer code for controlling a local process using a method as claimed in claim 1, wherein the computer code is executed by a computer to perform said method.

21. A signalling gateway comprising a plurality of local processes that are controlled using a computer program code as claimed in claim 20.

22. A method of recovering failure in a distributed signalling gateway maintaining a plurality of associations between a plurality of signalling gateway processes of said distributed signalling gateway and a plurality of application server processes of an application server, said method comprising the steps of:

initiating a traffic diversion in response to a failure message to set up an alternate path between said signalling gateway processes and said application server processes in case of fault affecting an association between a first application server process and a first signalling gateway process, said initiating comprising testing of a data type value of the queued data messages and, based on the data type value test result, either finding an alternate signalling gateway process for transmitting queued data messages to the application server process or forwarding data to an alternate application server process serving the application server;

initiating a switch back to include a new association linking the first signalling gateway process and the first application server process, the initiating a switch back comprising:

sending from the first signalling gateway process to at least one of the other signalling gateway processes a first inter-signalling gateway process control signal to flush messages to the first application server process on any diversion path associated with that other signalling gateway process;

verifying by a second a inter-signalling gateway process control signal that messages on diversion paths associated with the at least one other signalling gateway process have been received by application server processes; and controlling an active message acknowledgement by the first signalling gateway process, based on said verifying;

according to the change of status of any association, updating routing tables capable of routing data messages received by said signalling gateway processes to its destined application server processes; and distributing sequentially messages from said signalling gateway to said plurality of application server processes according to said routing tables.

23. The method as claimed in claim 22 wherein said step of initiating a traffic diversion further comprises the steps of:
- starting a protection timer;
- queuing messages destined for the application server process of the failed association;
- informing other signalling gateway processes of the fault so that other signalling gateway processes can avoid involving the failed association in a traffic diversion procedure initiated by them;
- controlling the transmission of an acknowledgement of the failure message so that data messages pending on the association are received at the application server process before the acknowledgement; and
- finding an alternate path to forward subsequent stateless processing messages onto another application server process through another association or to forward subsequent stateful processing messages through an alternate signalling gateway process still associated with the same application server process.

24. The method as claimed in claim 23 wherein said step of finding an alternate path to forward subsequent stateless or stateful processing messages further comprises the steps of:
- re-computing said routing tables for said application server if the traffic is carrying stateless processing messages;
- sending messages according to said newly updated routing tables if there are still active entries left in said routing tables and continuing to send messages until no active entry is left in said routing tables; and
- finding an active signalling gateway process to divert the traffic for said application service process if the traffic is carrying stateful processing, messages and sending said stateful processing messages onto said signalling gateway process through said alternate path.

25. The method as claimed in any of claims 22 to 24 wherein said step of initiating a switch back to include a new association further comprises the steps of:
- starting a protection timer further to the reception of an association activation;
- queuing data messages destined to the application server process of the new association;
- controlling the transmission of an acknowledgement of the association activation so that all diverted data messages have been transmitted via a diversion path;
- informing other signalling gateway processes of said new association; and
- re-computing said routing tables.

26. The method as claimed in claim 22 wherein said signalling gateway is coupled to a signalling end point across a signalling system No. 7 network.

27. The method as claimed in claim 22 wherein each signalling gateway process of said signalling gateway is coupled to each application server process across an internet protocol network.

28. The method as claimed in claim 23 wherein said stateful and stateless processing messages are respectively TCAP and non-TCAP messages identified by transaction identification numbers.

29. The method as claimed in claim 22 wherein said routing tables used for distributing signalling messages from said plurality of signalling gateway processes to said plurality of application server processes are SLS routing tables.

* * * * *

UNITED STATES PATENT AND TRADEMARK OFFICE
CERTIFICATE OF CORRECTION

| | | |
|---|---|---|
| PATENT NO. | : 7,916,854 B2 | Page 1 of 1 |
| APPLICATION NO. | : 10/817575 | |
| DATED | : March 29, 2011 | |
| INVENTOR(S) | : Marc Lamberton et al. | |

It is certified that error appears in the above-identified patent and that said Letters Patent is hereby corrected as shown below:

In column 16, line 53, in Claim 22, after "second" delete "a".

Signed and Sealed this
Twenty-seventh Day of December, 2011

David J. Kappos
*Director of the United States Patent and Trademark Office*